United States Patent [19]

Hing

[11] 4,316,936
[45] Feb. 23, 1982

[54] SEALING OF CERAMIC AND CERMET PARTS, SEALING MATERIAL THEREFOR AND CERAMIC SEAL OBTAINED

[75] Inventor: Peter Hing, London, England

[73] Assignee: Thorn Electrical Industries Limited, London, England

[21] Appl. No.: 72,248

[22] Filed: Sep. 4, 1979

[30] Foreign Application Priority Data

Sep. 6, 1978 [GB] United Kingdom ............ 35720/78

[51] Int. Cl.³ .................. B32B 5/16; B32B 9/00; C04B 35/66
[52] U.S. Cl. .................. 428/325; 156/89; 428/404; 428/472; 501/14; 501/120; 501/122; 501/128; 501/104; 501/105; 501/153; 501/154
[58] Field of Search .................. 106/47 R, 54, 62, 69, 106/73.5, 55, 57, 73.4, 58, 63, 69; 428/539, 325, 404, 472, 329; 156/89

[56] References Cited

U.S. PATENT DOCUMENTS

| | | | |
|---|---|---|---|
| 3,252,812 | 5/1966 | Lajarte | 106/54 |
| 3,556,821 | 1/1971 | Hanzlik | 106/54 X |
| 3,817,764 | 6/1974 | Wolf et al. | 106/54 X |
| 4,122,042 | 10/1978 | Anna et al. | 106/54 X |
| 4,155,124 | 5/1979 | Kawahara et al. | 106/73.4 X |
| 4,177,235 | 12/1979 | Neidhardt et al. | 106/73.4 X |

*Primary Examiner*—Thomas J. Herbert, Jr.
*Attorney, Agent, or Firm*—Robert F. O'Connell

[57] ABSTRACT

The invention provides a particulate sealing material for use in preparing hermetic seals between ceramic and cermet members, which material comprises at least 70 wt. % refractory oxide and minor quantities of non-vitreous additive comprising $SiO_2$, MgO and $B_2O_3$. This particulate sealing material is conveniently pressed into the form of a coherent element shaped to suit the particular sealing operation concerned, e.g. the sealing of an open end of a ceramic arc tube to a cermet closure therefor. The invention also provides a method of sealing a ceramic component to a cermet member by interposing said sealing material between the opposed faces of the component and member and applying heat and pressure to sinter the sealing material and achieve a seal between the component and member. It has been observed that the sintered sealing composition in the completed seal can have a microstructure characterized by flattened refractory oxide-rich islands aligned generally parallel to said faces and substantially surrounded and interconnected by non-vitreous material rich in oxides of silicon, magnesium, and boron and said non-vitreous material forming layers thinner than said islands and also aligned generally parallel to said faces. The invention is of especial advantage in the closure of the second end of a ceramic arc tube containing volatile fill constituents, since the seal can be effected without melting of the sealing material and hence with improved retention of the tube fill constituents.

6 Claims, 5 Drawing Figures

SEALING OF CERAMIC AND CERMET PARTS, SEALING MATERIAL THEREFOR AND CERAMIC SEAL OBTAINED

The present invention concerns techniques for sealing ceramic components, such as translucent polycrystalline alumina and transparent sapphire arc tubes, to cermet members such as alumina-tungsten and alumina-molybdenum composites, for example those described in German Specification (OS) No. 2,655,726, by simultaneous application of pressure and temperature using a specially formulated ceramic material as intermediate sealing material. The invention also concerns the intermediate sealing material for use in forming the seal, and the seal obtained.

The conventional method of sealing translucent polycrystalline alumina arc tubes or single crystal sapphire tubes to refractory metals, such as niobium and tantalum, and cermet materials, such as alumina-tungsten or alumina-molydenum, necessitates the melting of the sealing compound. For example, modified calcium magnesium aluminate compounds, the usable sealing compounds of the $MnO—SiO_2—Al_2O_3$ system described in U.S. Pat. No. 3,588,298, and the sealing compositions revealed in U.S. Pat. No. 3,588,573, have to be melted in the range of 1400° C. and 1800° C. The use of metal braze as sealing material also requires melting of the braze. In the construction of short ceramic discharge lamps containing sodium and/or metal halide lamp fill materials, these high temperatures needed for effecting the seals tend to volatilise the lamp fill materials which may thus escape. Furthermore most conventional sealing materials are not chemically resistant to metal halides at elevated temperatures.

A hot pressing technique is now widely used for the fabrication of dense sintered materials. It has also been used to join ceramic materials, such as alumina, via refractory metals, such as niobium or tungsten, at high temperatures above 1600° C. and pressures greater than 106 $Kg/cm^2$, as described in the article "High Performance Niobium-Alumina Electrical Insulators" published in the Science of Ceramics, p. 185–197, volume 7, 1973; the method involves, for example, forming an intermediate niobium deposit by the reduction of niobium pentafluoride with hydrogen and subsequently heating the alumina-niobium intermediate-alumina in vacuum up to 1700° C. under a pressure of 300 $Kg/cm^2$. These joints, with or without the use of intermediates, cannot be relied upon to be impervious to helium gas and are not particularly relevant to present purposes.

U.K. specification No. 801279 describes a method of manufacturing a coherent gas-tight alumina ceramic material by pressing and subsequently or simultaneously heating a mixture of from 80 to 99.5 weight % substantially pure alumina powder and 0.5 to 20 weight % of powdered preformed glass, the glass in the example given containing inter alia 48.3 weight % $SiO_2$, 2.5 weight % MgO, and 5.6 weight % $B_2O_3$. According to the teaching of this prior specification, however, the heating must be such that the whole of the glass content of the mixture melts to form a coherent vitreous matrix homogeneously distributed throughout the alumina mass. The prior specification does not suggest that the procedure described could be employed for sealing together a ceramic component and a cermet member, and the composition and procedure disclosed would in fact be unsuitable for the sealing of lamps with volatilisable fills because the melting of the glass can permit escape of the latter and because of the chemical incompatibility of the composition with fills such as metal halide vapours at elevated temperature.

The present invention provides a sealing material, and a method of using it, which can yield a ceramic-cermet seal without melting, the seal at least in preferred embodiments being hermetic and resistant to metal halides.

In accordance with this invention, a cermet member is sealed to a ceramic component by interposing between them a sealing material comprising at least 70% by weight refractory oxide and minor quantities of non-vitreous silicon, magnesium, and boron oxides, and heating the intermediate sealing material and the opposed faces of the component and member while compressing them together to sinter the sealing material to achieve a seal between the faces. The time of heating is preferably less than 60 minutes. The intermediate sealing material is conveniently provided as a preformed pressed element, such as a thin washer or gasket.

The invention also provides a sealing material for use in preparing hermetic seals between ceramic and cermet members, which material comprises, by weight, at least 70% refractory oxide and minor quantities of non-vitreous $SiO_2$, MgO and $B_2O_3$, preferably 70–97% refractory oxide, 1–10% MgO, 2–20% $SiO_2$ and up to 2% $B_2O_3$.

The refractory oxide of the sealing material according to the invention may be a single oxide, e.g. alumina, or a mixture of two or more refractory oxides.

The sealing technique according to the invention can be conducted using a high sealing temperature (e.g. 1500° C.) and a high sealing pressure (e.g. 300 $Kg/cm^2$), but has the advantage that it can be effective under milder conditions, e.g. a sealing temperature of 1000° C. or 1200° C. at a sealing pressure of 70 $Kg/cm^2$ or 140 $Kg/cm^2$, with even lower temperatures and pressures being possible. Thus in the closure of ceramic arc tubes with cermet members, the technique of the present invention permits the controlled closure to be effected at moderate temperatures of from 600° C. to 1200° C. and at moderate pressures between 50 $Kg/cm^2$ and 100 $Kg/cm^2$, reducing the risk of volatilisation of lamp filling materials as compared to that encountered with previous techniques. The present invention is particularly suitable for the construction of short ceramic discharge lamps, permitting controlled closure of the second ends of the lamps at relatively low temperatures so as to prevent or inhibit the volatilisation of the lamp filling materials.

Under the influence of stress, temperature, and time and with the intervention of the sealing material according to the invention, the discrete interfaces are merged and the bulk of the initially preformed sealing material is sintered to near theoretical density (e.g. above 98%) to give the seal. The seal obtained, especially wherein the ceramic component and the cermet member are alumina-containing and the refractory oxide of the sealing material is wholly or predominantly alumina, may be a hermetic seal impervious to helium gas.

In the course of the sealing operation according to the invention, the intermediate sealing material can become plasticised to some degree, even at relatively low temperatures and moderate pressures, so that there is no need to melt it.

Some preferred intermediate ceramic sealing materials, which have been formulated with a view to their chemical and thermal stability, are shown in Table I.

TABLE I

CERAMIC COMPOSITIONS USED AS INTERMEDIATE SEALING MATERIALS

| Example | $Al_2O_3$ Wt. % | MgO Wt. % | $SiO_2$ Wt. % | $B_2O_3$ Wt. % |
|---|---|---|---|---|
| 1 | 90.50 | 4.50 | 4.50 | 0.49 |
| 2 | 92.62 | 2.42 | 4.50 | 0.43 |
| 3 | 96.14 | 1.27 | 2.35 | 0.23 |
| 4 | 70.20 | 8.5 | 15.00 | 1.30 |
| 5 | 72.13 | 9.18 | 17.05 | 1.64 |
| 6 | 81.17 | 5.5 | 10.29 | 0.99 |

The materials of Examples 1 to 6 may be modified by replacing some or all of the alumina by one or more other refractory oxides. The detailed mechanism by which the sealing is effected in the present invention is not yet fully understood. However, since neither the compositions shown in Table I, nor mixtures of the magnesia, silica and boric oxide additives shown in Table I, show any sign of glass formation below 1300° C., it may be that small amounts of silica and boric oxide react with the alumina and magnesia to form complex compounds in minor quantity, which then become quite plastic below about 1100° C. on the application of a moderate pressure. Such compounds could presumably act as high temperature lubricants. A partially plastic state of the ceramic intermediate materials would allow considerable re-arrangement of the materials during sintering at fairly low temperature, without the need for a die to constrain the materials laterally and also without cracking.

Detailed investigation of ceramic seals obtained according to the invention has revealed a microstructure for the intermediate sintered sealing composition which is characterised by islands of refractory oxide-rich material which are of squashed or flattened shape and are generally aligned generally parallel to the opposed faces of the ceramic component and cermet member, these ceramic islands being substantially surrounded and joined together by non-vitreous $SiO_2$-, MgO- and $B_2O_3$-rich material which is disposed to a large extent in the form of relatively thin layers which extend over and between the opposed flattened faces of adjacent islands and are also generally aligned generally parallel to the said faces of the ceramic component and cermet member. The ceramic islands may for example have the shape of oblate spheroids with the ratio of the major to the minor axes being about 4:1, though this ratio is not critical and may vary according to the identity of the ceramic oxide and according to the temperature and pressure applied during seal formation. The aligned layers between the ceramic islands are thinner than the latter; they may for example be from 2 to 15μ thick, but this may also vary according to the temperature and pressure applied during seal formation and according to the proportion of non-vitreous additive present.

We have also found that the grain size in the bulk of the intermediate sintered sealing material in seals obtained according to the invention is generally substantially smaller than the grain size of the ceramic component and cermet member. For example, where alumina is the refractory oxide in the ceramic component, the cermet member and the intermediate sealing material of a seal according to the invention, the alumina grain size in the sintered sealing material may be from 1 to 10μ whilst that of the alumina in the ceramic component and cermet member may be from 10 to 50μ.

Accordingly, the invention also provides an integral composite body comprising a ceramic component and a cermet member having opposed faces sealed together by an interposed sintered composition which comprises at least 70% by weight refractory oxide and minor quantities of non-vitreous silicon, magnesium and boron oxides and which has a microstructure characterised by flattened refractory oxide-rich islands generally aligned generally parallel to the said faces and substantially surrounded and interconnected by non-vitreous silicon, magnesium, and boron oxide-rich material forming layers thinner than the islands and also generally aligned generally parallel to the said faces.

The particulate intermediate ceramic sealing materials and the pressed sealing components made from them may be prepared by any conventional ceramic technique. One method consists simply of mixing the appropriate amount of constituents in a tumbler mixer for an hour and calcining the mixed oxides at 900° C. for several hours in air in a high purity alumina crucible. A preferred method consists of mixing the refractory oxide (e.g. alumina) and magnesia precursors together with the other constituents; the mixture is then calcined at 900° C. for several hours in air, the preferred calcination time being 7 hours, and afterwards the material is allowed to cool to ambient temperature. The calcined oxides can be dry-milled for an hour to break the lumps, passed through a 250 micron aperture mesh sieve, and then mixed in a tumbler mixer for half-an-hour to give an intimate distribution of the constituents. Particulate materials with a specific surface area between 6 $m^2/g$ and 100 $m^2/g$ are preferably used, the most preferred specific surface areas being about 40 $m^2/g$. Low specific surface areas below 6 $m^2/g$ tend to limit the speed of sintering and high surface areas greater than 100 $m^2/g$ reduce the flow characteristics and make the preferred component difficult to eject from the die. Powders with a controlled surface area can be obtained by calcination of the appropriate amount of precursors at 900° C. for several hours in air.

In view of the above-mentioned observations concerning the microstructure of the intermediate composition in seals according to the invention, a preferred method of making the particulate mixture for use in the invention is to coat refractory oxide granules of the required size with finer particles of the non-vitreous additive comprising silicon, magnesium, and boron oxides. The refractory oxide may for example be in the form of granules from 20μ to 1000μ in diameter, and these may be obtained by various methods known in the ceramic art, e.g. spray drying or mechanically rolling the oxide powder in a container. For example, free flowing alumina granules, suitable for coating with the non-vitreous powder, can be obtained by wet milling one kilogram of 99.98% purity α or γ alumina powder, or a mixture of α and γ, with an average particle size of 0.3μ and a surface area of 30 $m^2g^{-1}$ for 6 hours with 2 liters of deionized water together with 0.05% by weight free magnesia (to promote densification and uniform grain growth). The slurry is subsequently dried, sieved through a 710 micron mesh and freely rolled to agglomerate most of the fine particles below 50 micron in diameter. The granulated material is subsequently sieved through various mesh sizes to give a final size within a specified range of diameters. Rare earth oxides, such as yttria or ytterbia, in quantities up to 0.1% by weight can be added in addition to magnesia to lower the sintering temperature. The size of the granules can be controlled by the duration of the rolling operation, the size increasing with increased rolling time. For example, granules of 200μ can be prepared by 20 minutes rolling but where necessary, rolling can be much more prolonged, e.g. in excess of 1 hour.

In order to redistribute the stresses uniformly in alumina granules, it has been found desirable to add magnesia during processing of the alumina powder. The addition of magnesia inhibits grain growth and promotes densification of the alumina >99.95% of theoretical density on sintering and, moreover, a uniform grain size is achieved. In the above example an addition of 0.05 weight % free magnesia is preferred. By adding higher amounts of magnesia, up to 0.25 weight %, the grain size of the sintered alumina can be further reduced, thus leading to an increase in strength of the ceramic. The preferred useful range is from 0.01 to 0.25 weight % MgO.

The refractory oxide granules can be coated with the finer (e.g. from 0.1 to 10 micron particle size) non-vitreous additive powder by rolling the granules and powder together, usually for a period of from 5 to 60 minutes. The coating may also be effected by a combination of tumbler mixing and mechanical rolling, e.g. by tumble mixing for 30 minutes followed by rolling for an additional 30 minutes.

The coated granules may be pressed to form a shaped element as previously described.

The sealing material according to the invention can be employed with alumina-containing ceramic components and cermet members, and also to join ceramic components and cermet members made from other materials, e.g. magnesium aluminate spinel (MgO.Al$_2$O$_3$); rare-earth oxides such as yttria (Y$_2$O$_3$); magnesia (MgO); thoria (ThO$_2$); members of the family of β alumina solid electrolyte materials such as Na$_2$O.nAl$_2$O$_3$, where n=5 to 11; silicon nitride; silicon carbide (SiC); and stablised zirconia (such as Y$_2$O$_3$.ZrO$_2$,CaO.ZrO$_2$ etc).

No special mechanical or chemical polishing of the surfaces to be joined is required. For instance, the ends of sintered alumina tubes can simply be machined and roughly ground with a diamond wheel. The surfaces of sintered cermet components which have been machined or pressed in the green stage do not need any further treatment after sintering.

For the construction of sealed arc tubes, it is first necessary to outgas the pressed ceramic intermediate sealing washers thoroughly in a vacuum, particularly when sealing the second ends of the tubes, for example for about 15 minutes between 500° and 600° C., in order to remove all traces of moisture which normally interferes with the starting, operation and performance of the ceramic discharge lamps.

The sealing material interposed between the ceramic tube and the cermet components is then sintered to near theoretical density in vacuum and/or inert atmosphere by the simultaneous application of pressure and temperature. The sealing technique according to the invention can be conducted at high sealing temperatures (e.g. 1500° C.) and high sealing pressures (e.g. 300 kg/cm$^2$), but has the advantage that it can be effective under milder conditions, e.g. a sealing temperature of 1000° C. or 1200° C. at a sealing pressure of 70 kg/cm$^2$ or 140 kg/cm$^2$, with even lower temperatures and pressures being possible. The load can be applied gradually as the temperature is being raised; it can also be applied in incremental steps, for instance, after the temperature has been raised to about 600° C., the temperature and pressure can be further increased to allow the sintering and hot joining to proceed to completion. The desired pressure can also be applied in one or more steps at about 600° C., the pressure then being allowed to decay gradually while the temperature is raised to allow densification and hot joining to proceed to completion. It can, however, be unsatisfactory to apply the full load at the beginning of the sealing operation as there is then a tendency for the intermediate and the other components to crack.

An important advantage of this sealing technique is that the closure of the second ends of arc tubes can thus be controlled at some intermediate temperature between 600 and 1200° C. with the application of moderate pressure between 50 kg/cm$^2$ and 100 kg/cm$^2$. The controlled closure ensures that (a) that arc tube can be backfilled with sufficient pressure of argon in the device, and (b) the escape of volatile vapours is inhibited because of the moderate temperature and the rapid formation of the seal with stress-enhanced solid state bonding reaction at the interfaces.

The sealing material and method according to the invention are distinctly different from those conventionally used in the sense that the conventional techniques necessitate the melting of the sealing compounds to wet the components being joined. The seals obtained by the present invention are particularly useful for the construction of short ceramic discharge lamps containing highly reactive fills, e.g. sodium and/or metal halides (for example, mercuric chloride, mercuric iodide, tin chloride, tin iodide, sodium chloride, sodium iodide, aluminium chloride, scandium iodide, as well as the iodides and chlorides of the rare earth metals).

A preferred maximum content of refractory oxide in the sealing material according to the invention is 93 wt.%; as the refractory oxide (e.g. alumina) content increases beyond this value, the minimum effective sealing temperature and pressure tend to increase above the lowest values mentioned above; furthermore in most instances at least the formation of a fully hermetic (helium-tight) seal can be difficult to achieve if the total content of plasticising components (the magnesium, silicon and boric oxides) is less than 7 wt.%. thus the material of Example 3 above gives at a sealing temperature of 1300° C. a joint which is strong but not fully hermetic.

If inconveniently high sealing pressure and time are to be avoided, a final sealing temperature of at least 1150° C. is generally required to give an adequate seal.

As refractory oxides which can be substituted for some or all of the alumina in the sealing material according to the invention there may be mentioned by way of example magnesium aluminate spinel, rare earth oxides such as Y$_2$O$_3$, magnesia, thoria, and stabilised zirconia (e.g. Y$_2$O$_3$.ZrO$_2$; CaO.ZrO etc.

In the accompanying drawings FIGS. 1 to 4 illustrate ways in which the method of the invention can be performed, and FIG. 5 illustrates the microstructure of a seal according to the invention. In particular:

Figure 1:
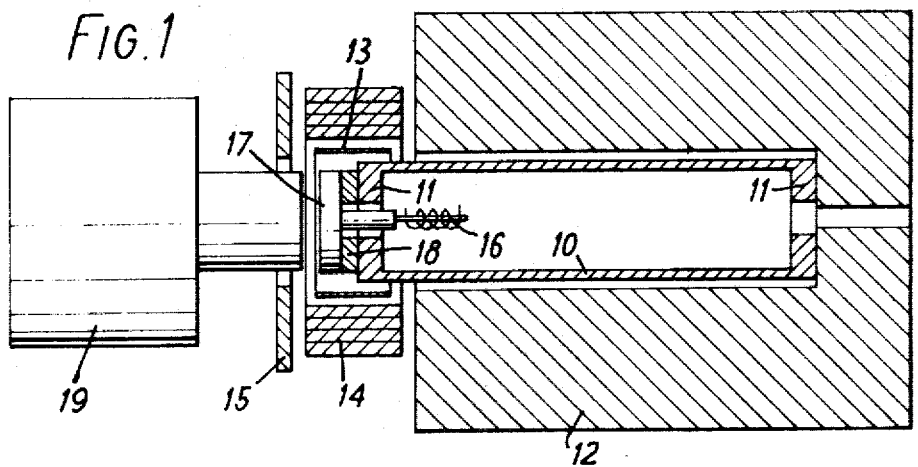
FIG. 1 is a diagrammatic section of a ceramic arc tube sealed by the technique of this invention with a conducting cermet cap having an electrode partly embedded therein.

In FIG. 1 an arc tube 10 having monolithic end plugs 11 is disposed in a mild steel support block 12, for the purpose of sealing, and the end of the tube being sealed is surrounded by a tantalum element 13 which is in turn surrounded by a molybdenum shield 14. An annular molybdenum shield 15 covers the outer ends of the element 13 and shield 14.

The tube is being fitted with a tungsten electrode 16 which is partly inserted and sintered in a cap 17 formed of conducting alumina-tungsten cermet of the kind described in German OS No. 2,655,726. A pressed ceramic intermediate sealing washer 18, of a composition as defined above, is disposed between the monolithic plug 11 and the shoulder of the cap 17. A sintered alumina punch 19 is brought up to the outer face of the cap 17 to apply uniaxial pressure along the axial direction of the cap 17 and tube 10.

The ceramic washer 18 and the adjacent surfaces of the plug 11 and cap 17 are heated electrically to a temperature within the preferred range defined above, while the components are forced together by pressure of the punch 19 towards the support block 12, the pressure being controlled within the preferred limits defined above.

An hermetic seal is thereby achieved between the tube 10 and the cap 17. The second end can then be sealed by reversing the tube in the support block and repeating the process, after introducing the necessary fill materials into the tube.

In the remaining Figures, similar parts are indicated by the same numerals and the support block, element and shields 12–15 are omitted for the sake of simplicity.

Figure 2:
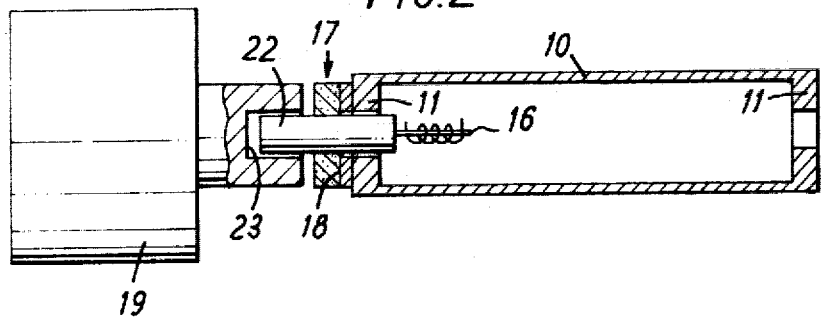
FIG. 2 is a similar view of a tube sealed with a conducting cermet rod extending through a cermet disc.

In FIG. 2 the cap 17 comprises a disc of either conducting or non-conducting cermet which is formed integrally with a central rod 22 of conducting cermet as described in the aforesaid German specification. The electrode 16 is sintered into the conducting rod 22, which serves as an electrical lead structure.

The punch 19 is formed with a hole 23 to accommodate the projecting end of the rod 22. This ensures correct location of the composite cap on the end of the tube, while pressure is exerted only on the disc portion 21 and thence on the intermediate washer 18.

It is an advantage of this invention that the surfaces of the composite cap 16 do not need any machining or other treatment prior to sealing by the technique described to give an hermetic seal.

Figure 3:
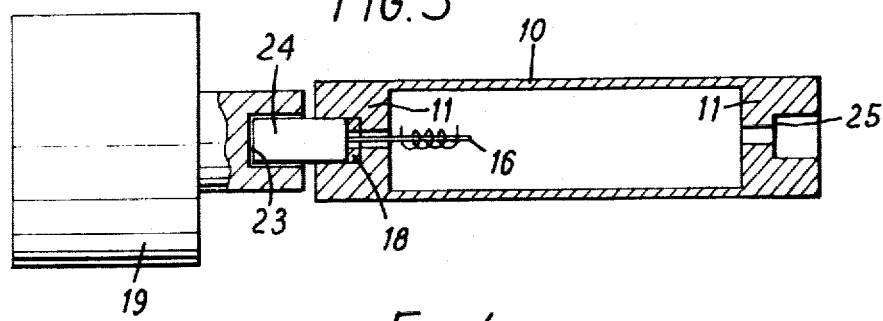
FIG. 3 is a similar view of a tube sealed with a conducting cermet rod disposed outside the tube.

In FIG. 3 the monolithic plug 11 is recessed and the closure has the form of a rod 24 formed of a conducting cermet, the inner end of which bears against the bottom of the recess 25 in the plug. The electrode 16 is sintered in the end of the rod 24 as before and the sealing washer 18 is interposed between the end of the rod and the bottom surface of the recess.

The punch 19 is recessed at 23 but, unlike FIG. 2, the pressure is exerted by the bottom of the recess directly on the end of the rod 17.

Figure 4:
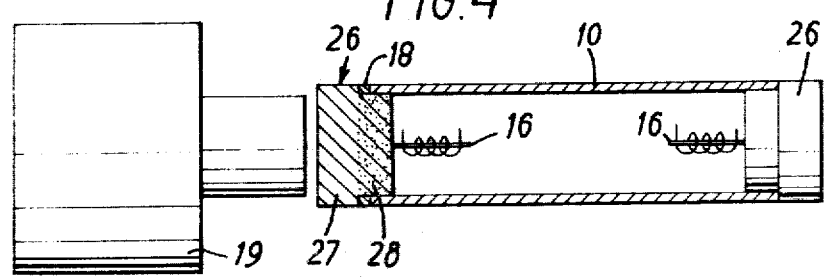
FIG. 4 is a similar view of a tube sealed with an end cap having integral conducting and non-conducting regions.

In FIG. 4, which shows the sealing of the second end of the arc tube 10, after the filling substances have been introduced, the tube is closed by means of composite caps 26 which fit into the open ends of the plain tube.

The caps 26 each have a conducting region 27, into which the support end of the electrode 16 extends, and a non-conducting region 28 adjacent to the tube ends. The cap is integrally formed from compatible alumina-tungsten cermet and alumina ceramic, for example, as described in our aforesaid German specification.

A thin washer 18 of intermediate sealing material is interposed between the second end of the tube and the shoulder of the corresponding composite cap 26.

The closure of the first end of the tube can be carried out by sintering a cap 26 in the end of the alumina tube 10 in hydrogen or a vacuum at about 180° C., to form an hermetic seal. Becaue the volatile fill has not yet been introduced into the tube it is permissible to use conventional high temperature techniques to close and seal the first end, although the method of this invention can be employed if desired. This applies equally to the structures shown in FIGS. 1 to 3.

After the tube has received its fill of volatile material its second end is then closed with a ceramic sealing intermediate and sealed by the hot pressing technique of this invention.

The following Examples are specific embodiments of the seals shown in the accompanying drawings.

EXAMPLE A

In FIG. 1, 17 is a conducting alumina tungsten cermet cap containing 0.07 vol.% of tungsten metal, 18 is a preformed ceramic intermediate of the composition of Example 1 above and 10 is a translucent polycrystalline alumina arc tube.

EXAMPLE B

In FIG. 2, 17 could be an integral conducting alumina-tungsten cermet cap containing 0.07 vol.% of tungsten metal, but this is difficult to press as a single unit. Preferably, 17 as shown in FIG. 2 is made up of two parts sintered together, namely a conducting alumina-tungsten cermet rod containing 0.07 vol.% of tungsten metal, and 22 a conducting alumina-tungsten cermet washer 21 containing 0.06 vol.% of tungsten metal.

Part 21 shrinks about 3%–4% more than part 22 and can produce a leak-tight joint during sintering. It is not essential for part 21 to be a conducting cermet washer; it could be a non-conducting cermet or alumina washer. 18 is a preformed ceramic intermediate of the composition of Example 2 above, and 10 is a translucent polycrystalline alumina arc tube.

EXAMPLE C

In FIG. 3, 24 is a conducting alumina-tungsten cermet rod containing 0.07 vol.% of tungsten metal, 18 is a preformed ceramic intermediate of the composition of Example 6 above, and 10 is a translucent polycrystalline alumina arc tube.

EXAMPLE D

In FIG. 4, 26 is an integral end plug made up partly of alumina 28 and partly of conducting alumina tungsten cermet 27 with 0.07 vol.% of tungsten metal. The shank of the tungsten electrode 16 is in contact with the conducting cermet region of the plug. 18 is a preformed ceramic intermediate of the composition of Example 4 above, and 10 is a translucent polycrystalline alumina arc tube.

Figure 5:
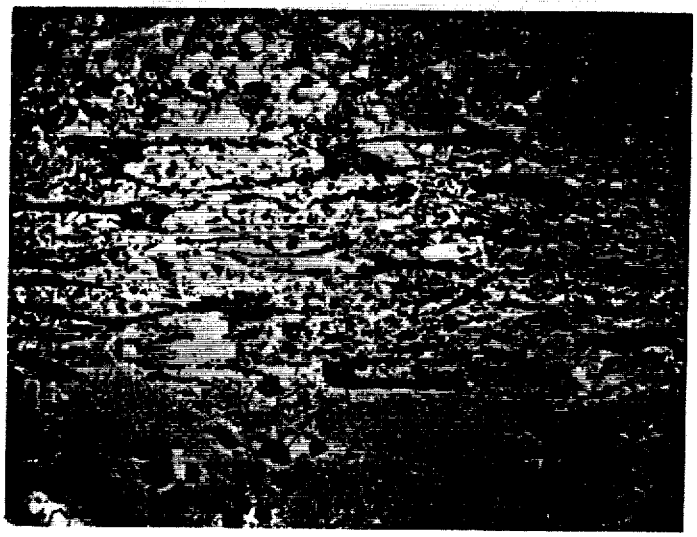
FIG. 5 is a photomicrograph of a secton taken through a seal according to the invention.

FIG. 5 of the accompanying drawings is a photomicrograph (×116) of a polished and slightly etched section through part of a seal according to the invention between an upper (as seen in the Figure) cermet member and a lower (as seen in the Figure) ceramic member by way of an intermediate sintered layer of sealing material.

In the structure shown in the photomicrograph, the cermet is a sintered alumina-tungsten composition and the upper part of the microscopic section shows areas of alumina and a network of particulate tungsten extending between the alumina areas. The intermediate ceramic sealing composition, which had the formulation given in Example 2 of Table I, exhibits flattened islands, rich in refractory oxide (alumina), aligned across the section parallel to the interfaces with the cermet and ceramic components, the islands being surrounded and interconnected by thin areas of non-vitreous material (comprising the silica, magnesia and boron oxide) which are also elongated in the direction parallel to the interfaces.

The ceramic member in the lower part of the photomicrograph is of sintered polycrystalline alumina. The seal was formed by the hot pressing technique described above.

I claim:

1. A particulate sealing material for use in preparing hermetic seals between ceramic and cermet members, which material comprises at least 70 wt. % of a refractory oxide selected from alumina, magnesium aluminate spinel, a rare earth oxide, magnesia, thoria and stabilized zirconia and minor quantities of a non-vitreous additive comprising $SiO_2$, MgO and $B_2O_3$.

2. A material as claimed in claim 1 comprising by weight 70–97% refractory oxide, 1–10% MgO, 2–20% $SiO_2$ and up to 2% $B_2O_3$.

3. A material as claimed in claim 1 containing at most 93 wt.% refractory oxide.

4. A material as claimed in claim 1 wherein said refractory oxide comprises alumina.

5. A material as claimed in claim 1 comprising refractory oxide granules coated with finer particles of said additive.

6. A shaped pressed element of a sealing material as claimed in claim 1.

* * * * *